Patented Nov. 28, 1933

1,937,205

UNITED STATES PATENT OFFICE 1,937,205

STORAGE BATTERY SEPARATOR

John H. Reilly, Cincinnati, Ohio, assignor to The Richardson Company, Lockland, Ohio, a corporation of Ohio No Drawing. Application April 18, 1929
Serial No. 356,295

10 Claims. (Cl. 136—148)

It is an object of my invention to produce separators for storage battery use by a process analogous to that of making of paper.

It is a second object of my invention to provide a new storage battery separator which will not have the defects of ordinary separators but will be very inexpensive. For example, wooden separators must be kept wet at all times. These new separators can be shipped and stored dry.

The requirements for a successful separator to be used between the plates in an accumulator cell are very exacting. The material of the separator must first of all be an insulator. Secondly, it must be porous and preferably should have a greater porosity than the wooden separators in common use. Thirdly, it must be proof against sulphuric acid of a specific gravity of 1.3 at a temperature of 150° F. or more. Fourthly, it should possess a considerable degree of mechanical strength and specifically it should be quite stiff without being brittle. Fifthly, it must be free from impurities such as iron and manganese.

Hitherto, the majority of separators used have been made of wood. Artificial products have not in general possessed the required porosity and even wood has been deficient in this respect. It would obviously be a considerable advantage if a separator could be made from felted fibers, because such a separator would presumably not only be more porous but could be manufactured with greater economy.

However, most organic substances are carbonized to some degree by sulphuric acid of the strength used in a storage battery and are thereby impaired in strength and may even be disintegrated. If organic fibers are to be used, then the problem becomes one of devising a method of acid-proofing fibers and at the same time being able to form them into a porous sheet. Secondly, as pointed out above, since stiffness and strength are required, the problem also includes that of making a stiff sheet of proper strength which will not become weak and limp.

The solution of these problems and the attainment of the objects set forth above and other objects which will become apparent upon reading these specifications, I attain in that process and product of which I shall now describe a preferred embodiment.

My invention contemplates the use of fibrous material which has been acid-proofed, and bitumen, in the formation of a stock which can be felted upon a paper machine or equivalent device or otherwise formed into a porous sheet, and which may contain filler materials. The acid-proofing of organic fibers has been attempted by saturating them, for example, with asphaltum; but this method alone I have found unsatisfactory for the reason that if so little asphaltum is added as to permit me to secure a satisfactorily porous sheet, the fibers are not likely to be thoroughly acid-proofed; whereas, if enough is used thoroughly to acid-proof the fibers, the sheet is no longer porous.

I have discovered that vegetable fiber saturated with sodium silicate gives in practice a satisfactory material for conversion into acid-proof fiber by subsequent treatment. Moreover, when fiber treated in this manner is brought into association with asphalt after the manner which I shall hereinafter describe, the asphalt appears not to wet the fibers but forms in small particles throughout the mass. This obviously is of great importance from the point of view of porosity, because the asphalt in globular or particle forms binds small masses or tufts, which dispersion of bound tufts is fine enough and in extent sufficient to simulate a honey-comb structure. In my preferred form of battery separator, the fiber which I use is jute.

I have found that aggregates of jute fiber, which have been soaked with a water solution of sodium silicate, may be treated in a beating engine to fit the fiber for felting and then may be mixed with asphalt and sufficient water to form a pulp suitable for sheet making. A preferred operation may be to beat the fibres in the silicate solution without a preliminary soaking, then add the asphalt.

*Formula 1*

250 grams air dry jute fibre
1000 grams sodium silicate 42.5° Bé. factor 1 $Na_2O$ to 3.25 $SiO_2$
200 grams benzol, in which is dissolved
200 grams hard asphalt, ball and ring melting point 240° F., penetration 150° F., 100 grams, 5 seconds of 10
450 cc. hydrochloric acid (1 part concentrated acid to 1 part water)
500 grams filler.

The 42.5° Bé. silicate solution is poured into a paper mill beater, then the jute fibre is furnished together with enough water to circulate the stock. Immediately after the fibre furnishing is completed the filler is added. Up to this point and until the fibre is properly refined and mixed in with the filler, the beater roll has been manipulated. From now on it is necessary to run with the beater roll up, or with a very minimum of manipulation, so that the addition of the asphalt in benzol solution at this point will result in a mere mixing action.

The process now enters a different stage, wherein enough hydrochloric acid is added directly to the contents of the beater to precipitate almost all the sodium silicate as a silicon hydroxide gel, leaving but enough to maintain a slight alkalinity, which protects the beater and other paper-making machinery from corrosion. The weight of acid given in the formula is but approximate and needs control by a chemical indicator such as litmus paper. The precipitated gel surrounds and permeates the fibres and after dehydration in later stages of the process deposits finely divided silica in the pores of the cells.

After the reaction with acid, the pulp is treated like ordinary paper making pulp and can be formed into webs on the paper machine; it can be molded into sheets on vacuum molding apparatus; it can be pressed into shape with molds having porous plates and embossing plates. In other procedures the wet sheet on the first driers of the paper machine can be embossed by fluted rolls so that after passage over the remaining driers, a dried sheet comprising elongated separators side by side is produced and can be cut into dimensions. Another procedure is to form the pulp into a web on a paper machine, dry it, then feed the rolls or individual sheets of the paper through an embossing machine operating somewhat on the principle of floor covering printing machines, whereby, after moistening the sheet with water, the embossing dies come down and form the sheet into the shape of separator desired. Beside producing a silica gel the reaction between hydrochloric acid, sodium silicate and various impurities in the pulp, produces water soluable compounds such as sodium and iron chloride, etc. These substances must be removed from the finished separator to prevent them from adversely affecting the accumulator. Part of this is removed when the pulp is diluted and formed into a sheet on the paper making screens, the remainder of the substances is removed by washing the finished separator in water before inserting it in the accumulator.

As a variant of the process outlined above as exemplary, I may use the same formula, essentially, as that given above, but introduce the asphalt otherwise than in benzol solution. To operate with this formula, which avoids the fire hazard of benzol, it suffices to keep the temperature of the beater water down to 70 or 80° F. and add the asphalt in molten form at 400–450° F. to the cooled contents of the beater. The rapid chilling of the asphalt crackles it, and the action of the beater roll reduces it to powdery fragments of irregular sizes and shapes, which fragments, after the formation of the pulp into sheets, are incorporated into the felted mass by fusion and penetration into those fibres immediately around each fragment. Where the formula calls for 200 parts asphalt to the finished product, it is necessary to use an excess during the mixing to compensate for those large particles that drop to the bottom of the beater and remain there.

In the characteristic embodiment of my invention I form a storage battery separator by felting a web of acid-proofed fibres, the web containing enough mineral filler to give it a required degree of porosity, and enough bituminous material to give it added strength and stiffness. But, in order that the desirable porosity be not destroyed, the bitumen must exist in the finished web in substantially a discontinuous phase. Anything amounting to a saturation of the web, would of course be detrimental. I have already described two procedures by which bitumen may be got into the web in the required condition. A third exemplary procedure involves introducing the bitumen in association with a preformed pulp. This may be done in several ways, as by pulverizing bitumen and mixing it with a pulp, or by emulsifying it and mixing it with a pulp, with or without a flocculating agent. I prefer, however, to form what I term a "bituminous pulp", which is a pulp in which bitumen exists in minute uncoated particles in stable association with a fibrous material. The copending application Serial No. 314,551, filed October 23, 1928 by Harry C. Fisher and the copending application Serial No. 316,611 filed November 1, 1928, (now Patent No. 1,771,150, granted July 22, 1930) by Earl P. Stevenson and Harry A. Buron, both teach procedures resulting in the formation of "bituminous pulps." A satisfactory formula for use in this third exemplary process is:

250 gram air dry jute
2000 grams sodium silicate solution 42.5° Bé. gravity (1:3.25 factor)
125 grams asphalt testing: penetration 77/100/5=1, ball and ring melting point of 184° F.
125 grams newspapers
500 grams filler.
600 cc. hydrochloric acid (1 part concentrated acid to 1 part water).

The asphalt and newspapers are mixed to a watery bituminous pulp in accordance with the teachings of either of the copending applications referred to, and after the beating off of the jute and filler in the silicate solution, the bituminous pulp is mixed in, preferably without beating. Finally, the acid is added, and the separator pulp is ready for fabrication into final shape as heretofore described.

The quality of fillers plays an important part in the making of a satisfactory product by my invention. Finely divided porous or absorbent materials such as some of the diatomaceous earths and finely divided silicas give an inferior result. Best results are obtained with gritty nonporous fillers. Fillers which, under the microscope, resemble pieces of glass, mostly with slightly rounded edges, or slag, of various sizes and shapes ranging from irregular flat pieces to long thin column-like fragments, distorted cubes, pyramids, etc., with some particles that are classified most easily as chunks, produce the best results. With this type of filler the screen analysis seems to play a secondary part, in that good results can be obtained with the filler as coarse as through 100 or 200 mesh or all through 300 mesh screens.

It is necessary of course that all the raw materials used for fibrous separators be as free as possible from iron, manganese and other compounds that adversely affect the performance of accumulators. Sometimes fibrous materials contain an appreciable amount of such substances; and it should be noted that the acid treating stage of this process largely converts these substances into water soluble modifications which are removed when the diluted pulp forms into a sheet on the paper machine and when the finished separator is washed in water.

Finally, battery separators are preferably accurate as to dimensions, and this involves another problem. When separators are formed to shape and dimensions upon the wet end of the machine and dried afterward, the drying produces a considerable shrinkage. To counteract this, it suffices to make the separator as a flat felted sheet, thoroughly dry, and after moistening it with water, to press it to the desired shape.

Various modifications in my invention may be made without departing from the spirit thereof.

Having thus described my invention what I claim as new and desire to secure by Letters Patent, is:—

1. That process of producing a storage battery separator which comprises treating jute fiber with silicate of soda and beating, adding asphaltum and filler material to said beaten fiber to make a mixture comprising approximately 50% of treated fiber, 10% of asphaltum and 40% of filler, adding acid and forming said mixture into a pulp in water suspension, felting said pulp upon a screen and drying, whereby a porous acid-proof sheet is produced.

2. That process of producing a storage battery separator which comprises forming a pulp of vegetable fibers, bituminous substance and a soluble silicate, precipitating an insoluble silicon compound in said pulp by the addition of acid, and felting said pulp upon a screen.

3. That process of producing a storage battery separator which comprises forming a pulp of vegetable fibers, bituminous substance and a soluble silicate, precipitating an insoluble silicon compound in said pulp by the addition of acid, and felting said pulp upon a screen, afterward wetting and pressing the sheet so formed.

4. That process of producing a storage battery separator which comprises forming a pulp of vegetable fibers, bituminous substance and a soluble silicate, precipitating an insoluble silicon compound in said pulp by the addition of acid, and felting said pulp upon a screen, said acid addition being sufficient only to react with said soluble silicate, and leaving a slight alkalinity in the pulp.

5. That process of producing a felted product which comprises introducing a soluble silicate in water solution into a beater, adding fibrous material and enough water to permit beating, and beating said material into a pulp suitable for felting upon a screen, and during beating, adding a bituminous material to said pulp, thereafter treating said pulp with acid, and felting it upon a screen.

6. That process of making a storage battery separator which comprises providing a quantity of silicate of soda, adding vegetable fiber thereto, and beating said fiber to a pulp with sufficient water for the proper action of the beating engine, introducing into said beater insufficient bituminous substance to fill all of the voids in an article to be sheeted from said pulp, treating said pulp with acid, and felting and drying said pulp on a screen, afterward forming said felted pulp into a separator.

7. That process of producing a storage battery separator which comprises adding 5000 parts by weight of 43 degree Baumé sodium silicate solution of a factor at least 1:3.25 to a beater, adding 250 parts by weight of jute fiber with sufficient water to permit beating, and beating said fiber into a pulp, adding 500 parts acid-proof mineral filler and 200 parts hard asphalt in molten condition and continuing said beating until said asphalt has been uniformly distributed throughout said pulp, adding 500 parts by weight of hydrochloric acid gas in water solution, and felting said pulp into a sheet upon a screen.

8. That process of producing a storage battery separator which comprises adding 5000 parts by weight of 43 degree Baumé sodium silicate solution of a factor at least 1:3.25 to a beater, adding 250 parts by weight of jute fiber with sufficient water to permit beating, and beating said fiber into a pulp, adding 500 parts acid-proof mineral filler and 200 parts hard asphalt in molten condition and continuing said beating until said asphalt has been uniformly distributed throughout said pulp, adding 500 parts by weight of hydrochloric acid gas in water solution, and felting said pulp into a sheet upon a screen, and drying the sheet so formed, afterward wetting and pressing it.

9. That process of making a storage battery separator which comprises beating vegetable fibres in the presence of a soluble silicate to fit them for felting, adding a quantity of a pulp of fibrous material having finely divided bituminous material in association therewith, adding an inert filler material and an acid which will react with said silicate to form an insoluble silicon compound, forming the mixture into a pulp, felting said pulp upon a screen, and drying the sheet so formed.

10. That process of making a storage battery separator which comprises beating vegetable fibres in the presence of a soluble silicate to fit them for felting, adding a quantity of a pulp of fibrous material having finely divided mineral material in association therewith, adding an inert filler material and an acid which will react with said silicate to form an insoluble silicon compound, forming the mixture into a pulp, felting said pulp upon a screen, and drying the sheet so formed, afterward wetting and pressing the said sheet.

JOHN H. REILLY.